United States Patent [19]
Olivier

[11] Patent Number: 5,322,083
[45] Date of Patent: Jun. 21, 1994

[54] REFRIGERANT PIPE PIERCING VALVE APPARATUS

[76] Inventor: Rick A. Olivier, 1390 Route 28A, P.O. Box 745, Cataumet, Mass. 02534-0745

[21] Appl. No.: 120,077

[22] Filed: Sep. 13, 1993

[51] Int. Cl.$^5$ .................. F16K 43/00; B23B 41/08; F16L 41/04
[52] U.S. Cl. ............................... 137/318; 222/5; 222/83; 408/97
[58] Field of Search ............... 137/15, 318; 138/97, 138/99; 222/5, 81, 83, 83.5; 408/97, 115 B, 115 R

[56] References Cited

U.S. PATENT DOCUMENTS

| | | | |
|---|---|---|---|
| 2,418,234 | 4/1947 | McCullough | 408/97 |
| 2,875,777 | 3/1959 | Lacart | 137/318 |
| 3,030,828 | 4/1962 | Callen | 137/318 |
| 3,115,889 | 12/1963 | Franck et al. | 137/318 |
| 3,162,211 | 12/1964 | Barusch | 137/318 |
| 3,450,149 | 6/1969 | Brinda | 137/318 |
| 3,648,725 | 3/1972 | Strybel | 137/318 |
| 3,788,345 | 1/1974 | Tura | 137/318 |
| 3,915,192 | 10/1975 | Skvarenina | 137/318 |
| 4,611,624 | 9/1986 | Snyder | 137/318 |
| 5,105,844 | 4/1992 | King, Sr. | 137/318 |

*Primary Examiner*—George L. Walton
*Attorney, Agent, or Firm*—E. Michael Combs

[57] ABSTRACT

An elongate body includes a first fixed jaw fixedly and orthogonally mounted to the body, having a second sliding jaw, with the fixed jaw and the sliding jaw arranged to secure a pipe therebetween, such as the first jaw includes a piercing head. The piercing head includes a conduit structure in pneumatic communication with further conduit structure directed through the first jaw and body extending through the body, such that the body includes a further projection portion arranged for securement to conductive tubing.

5 Claims, 4 Drawing Sheets

REFRIGERANT PIPE PIERCING VALVE APPARATUS

BACKGROUND OF THE INVENTION

1. Field of the Invention

The field of invention relates to pipe piercing valve apparatus, and more particularly pertains to a new and improved refrigerant pipe piercing valve apparatus wherein the same is directed to the safe conduction of refrigerant from a refrigerant tubing arrangement.

2. Description of the Prior Art

The ecologically sound disposal of contemporary CFC's and HCFC's must be conducted in a manner to prevent loss of such refrigerant fluids into the atmosphere. The instant invention permits the ease of mounting refrigerant conductive conduits for the removal and storage of such refrigerants in a safe and ecologically sound manner and in this respect, the present invention substantially fulfills this need.

Prior art structure relative to valve apparatus, and more particularly piercing valve apparatus arranged for securement to a tube structure is indicated in the U.S. Pat. Nos. 3,450,149; 3,978,881; 4,611,624; 4,921,004.

SUMMARY OF THE INVENTION

In view of the foregoing disadvantages inherent in the known types of pipe piercing valve apparatus now present in the prior art, the present invention provides a refrigerant pipe piercing valve apparatus wherein the same is arranged to include cooperative jaw structure having conductive conduit structure contained therewithin for the removal of a refrigerant relative to a refrigerant carrying tube. As such, the general purpose of the present invention, which will be described subsequently in greater detail, is to provide a new and improved refrigerant pipe piercing valve apparatus which has all the advantages of the prior art pipe piercing valve apparatus and none of the disadvantages.

To attain this, the present invention provides an elongate body including a first fixed jaw fixedly and orthogonally mounted to the body, having a second sliding jaw, with the fixed jaw and the sliding jaw arranged to secure a pipe therebetween, such as the first jaw includes a piercing head. The piercing head includes a conduit structure in pneumatic communication with further conduit structure directed through the first jaw and body extending through the body, such that the body includes a further projection portion arranged for securement to conductive tubing.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved refrigerant pipe piercing valve apparatus which has all the advantages of the prior art pipe piercing valve apparatus and none of the disadvantages.

It is another object of the present invention to provide a new and improved refrigerant pipe piercing valve apparatus which may be easily and efficiently manufactured and marketed.

It is a further object of the present invention to provide a new and improved refrigerant pipe piercing valve apparatus which is of a durable and reliable construction.

An even further object of the present invention is to provide a new and improved refrigerant pipe piercing valve apparatus which is susceptible of a low cost of manufacture with regard to both materials and labor, and which accordingly is then susceptible of low prices of sale to the consuming public, thereby making such refrigerant pipe piercing valve apparatus economically available to the buying public.

Still yet another object of the present invention is to provide a new and improved refrigerant pipe piercing valve apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
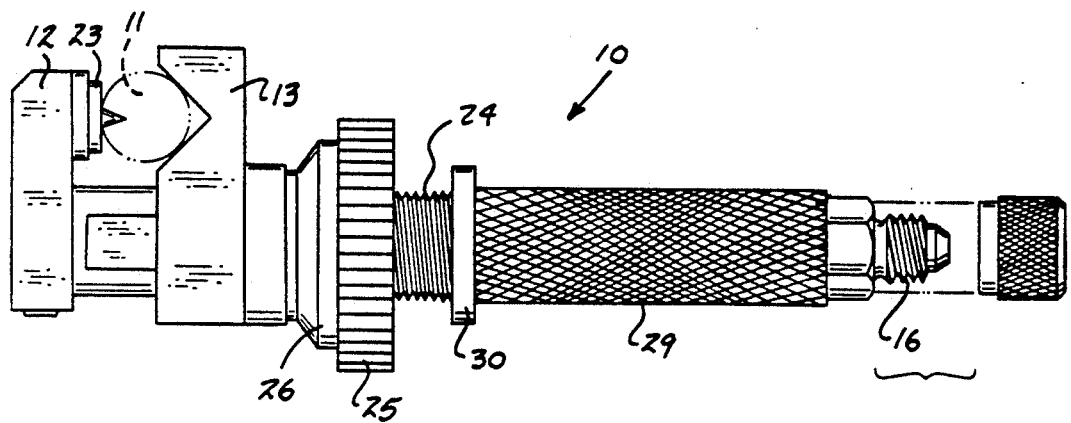
FIG. 1 is an orthographic view of the invention.

With reference now to the drawings, and in particular to FIGS. 1 to 8 thereof, a new and improved refrigerant pipe piercing valve apparatus embodying the principles and concepts of the present invention and generally designated by the reference numeral 10 will be described.

Figure 2:
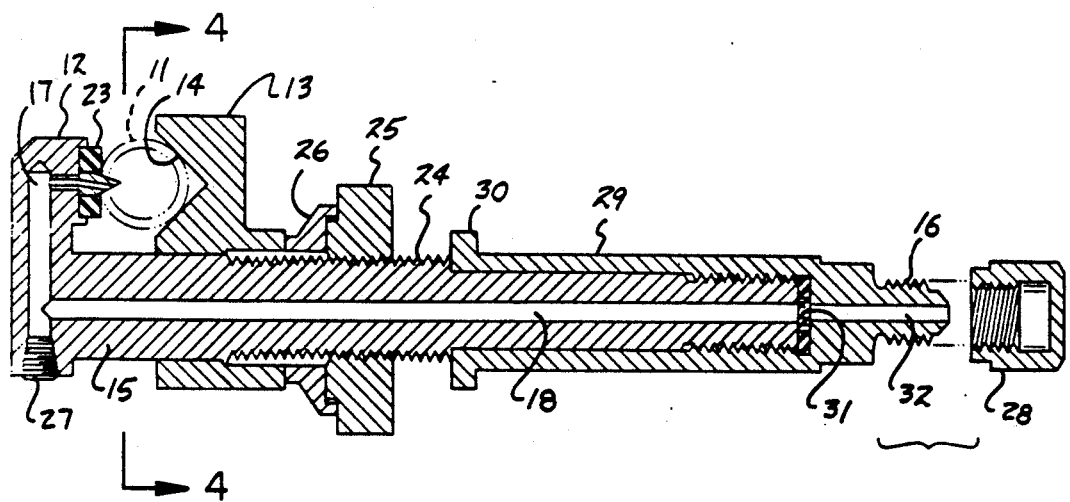
FIG. 2 is an orthographic cross-sectional illustration of the invention.
Figure 3:
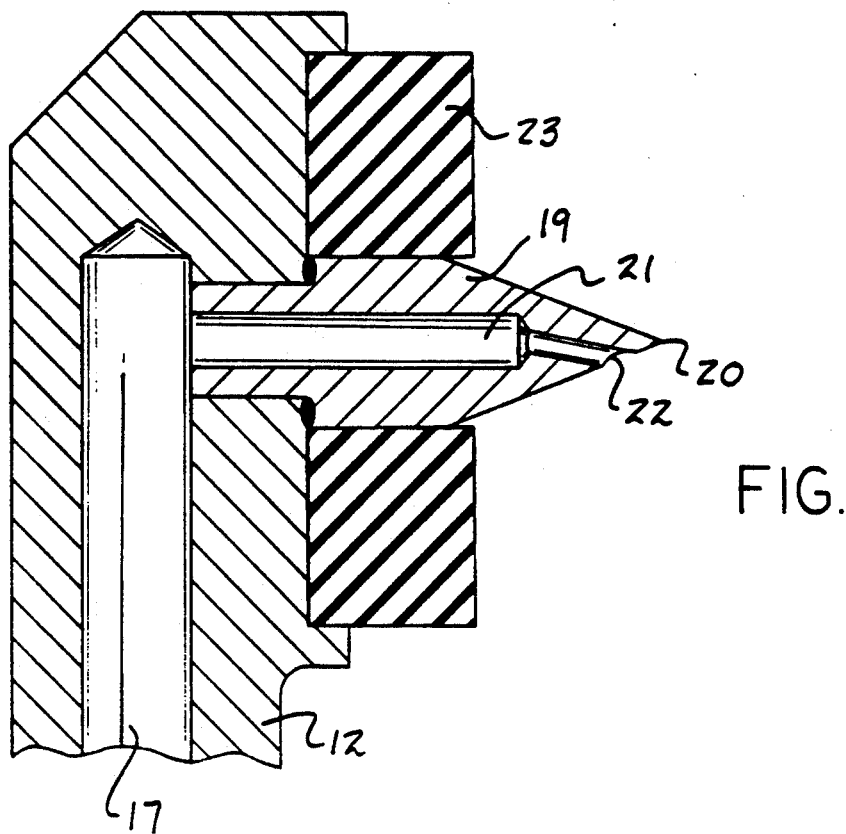
FIG. 3 is an enlarged orthographic view in cross-section of the first jaw plate.
Figure 4:
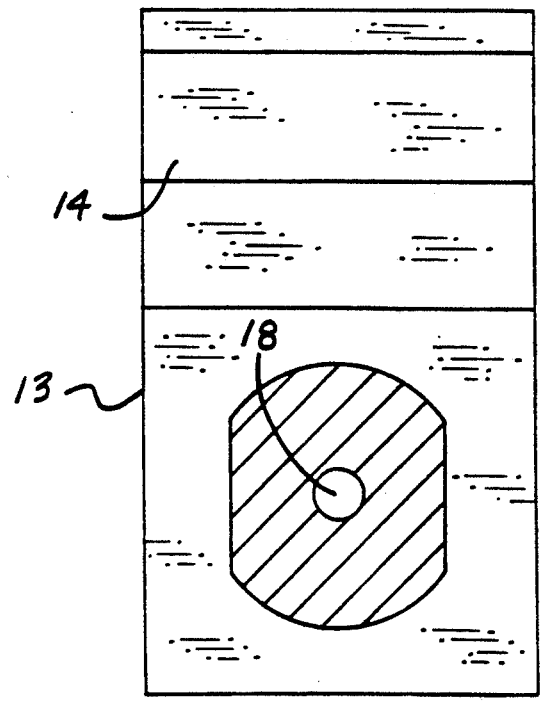
FIG. 4 is an orthographic view, taken along the lines 4—4 of FIG. 2 in the direction indicated by the arrows.

More specifically, the refrigerant pipe piercing valve apparatus 10 of the instant invention essentially comprises the convenient and ecologically safe manner of piercing a pipe 11 containing a refrigerant therewithin, to include CFC and HCFC refrigerant type material. To this end, a first jaw plate 12 is fixedly mounted to an elongate body 15 in an orthogonal relationship at a first end of the body. A second jaw plate 13 is slidably directed along the body in a facing relationship relative to the first jaw plate, with the second jaw plate 13 having a recess 14 to receive the pipe 11 therewithin. The elongate body 15 includes a body sleeve 29 arranged to receive a second end of the body therewithin in a threaded inter-relationship, such as indicated in FIG. 2, with the body sleeve 29 having an abutment flange 30 arranged to prevent removal of a wheel member 25 threadedly engaging a threaded body portion 24 of the elongate body that is oriented between the second jaw plate 13 and the abutment flange 30. The sleeve 29 includes a threaded projection 16 coaxially aligned with the body and the sleeve extending beyond the body arranged to selectively receive an internally threaded cap 28 and alternatively arranged to secure a conduit tubing structure for the convenient reception of the freon type material received from the pipe 11.

A piercing head 19 is fixedly mounted to the first jaw plate 12 in a facing relationship medially of the recess 14. The piercing head 19 terminates in a tip 20 coaxially aligned with the piercing head 19. A first conduit 17 is directed through the first jaw plate 12 in communication with a second conduit 18 directed through the elongate body 15. A third conduit 21 extends from the first conduit 17 through the piercing head and terminating in a third conduit entrance 22 extending through the piercing head displaced relative to the tip 20 to prevent debris from entering the third conduit 21, or at least minimizing such occurrence. A sealing pad 23 is arranged in surrounding relationship relative to the piercing head 19. A wheel member 25 is thusly threadedly mounted to the elongate body about the threaded body portion 24 and abuts the engaging head 26 to slidably move the second jaw plate 13 towards the first jaw plate 12 to effect piercing and projection of the piercing head 19 through the associated pipe 11 and subsequent flow of freon to be reclaimed through the third conduit 21, the first conduit 17, and second conduit 18 through the threaded projection 16 that includes a fourth conduit 32 that is coaxially aligned and in communication with the second conduit 18 through a screen 31 to provide for capturing of particulate into the screen and thereby enhancing the reclaiming of freon in a reusable state.

It should be further noted that an access plug 27 is directed into the first conduit through the first jaw plate 12 at a distal end of the first jaw plate relative to the piercing head for the cleaning of the first conduit as required if such be deemed necessary. The internally threaded cap 28 as indicated when mounted to the threaded projection 16 maintains the first, second, third, and fourth conduits in a relatively uncontaminated state.

Figure 5:
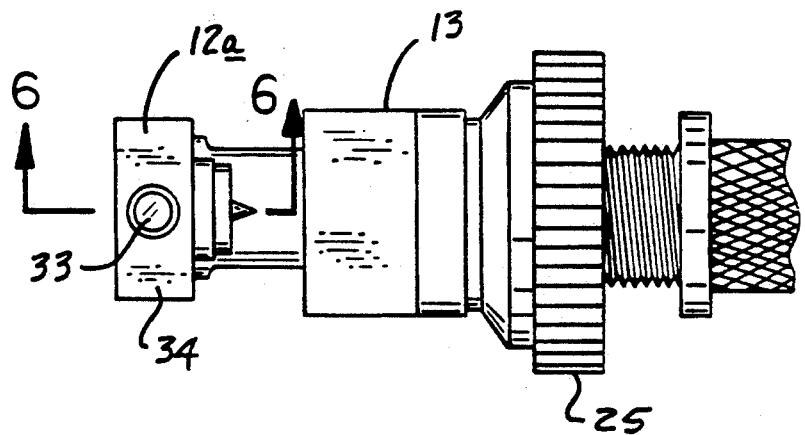
FIG. 5 is an orthographic top view of a modified first jaw plate.
Figure 6:
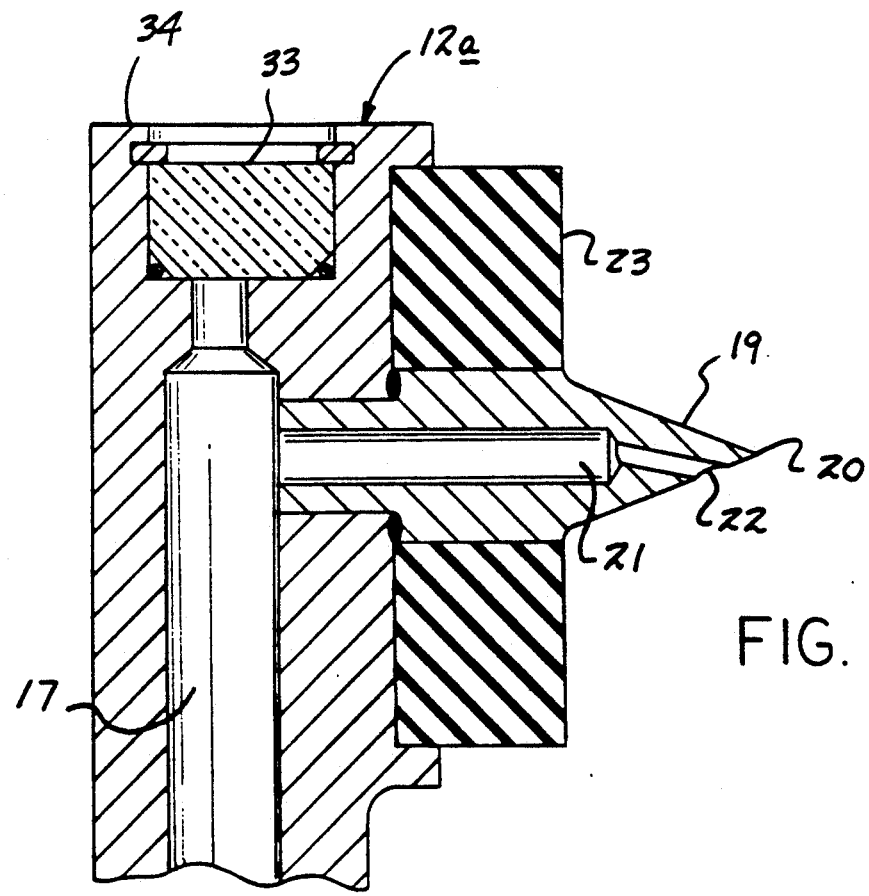
FIG. 6 is an orthographic view, taken along the lines 6—6 of FIG. 5 in the direction indicated by the arrows.

The FIG. 5 and the FIG. 6 indicate the use of a modified first jaw plate 12a, having a first jaw plate top wall such that a lens 33 is mounted within the first jaw plate in adjacency to the first jaw plate top wall in communication with the first conduit 17 to permit the viewing of freon flow through the first conduit to permit ease of visual understanding when such freon flow has been completed.

Figure 7:
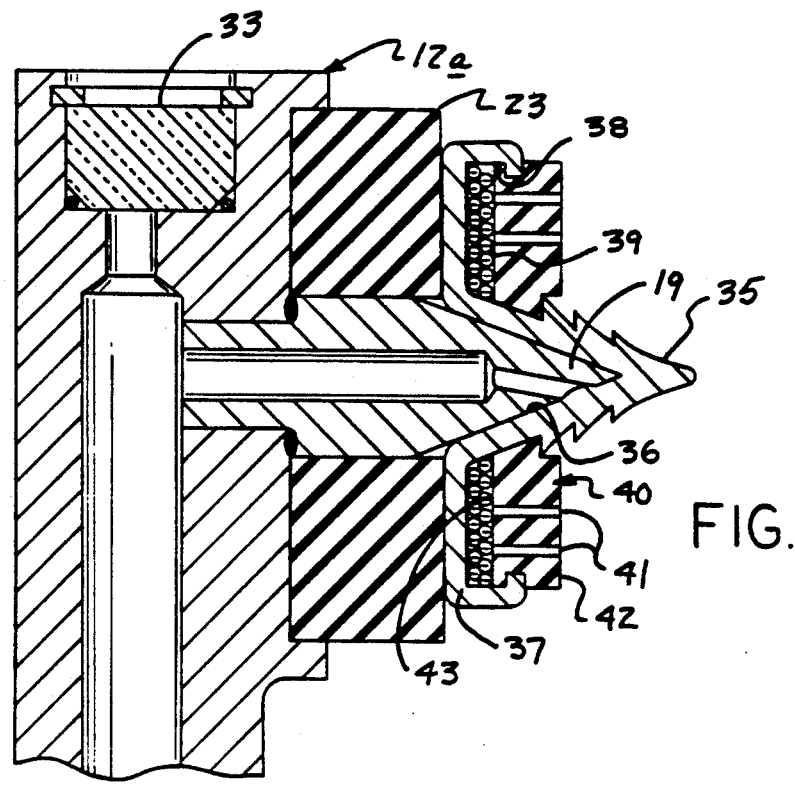
FIG. 7 is an orthographic cross-sectional illustration of the invention to further employ a pipe plugging structure.
Figure 8:
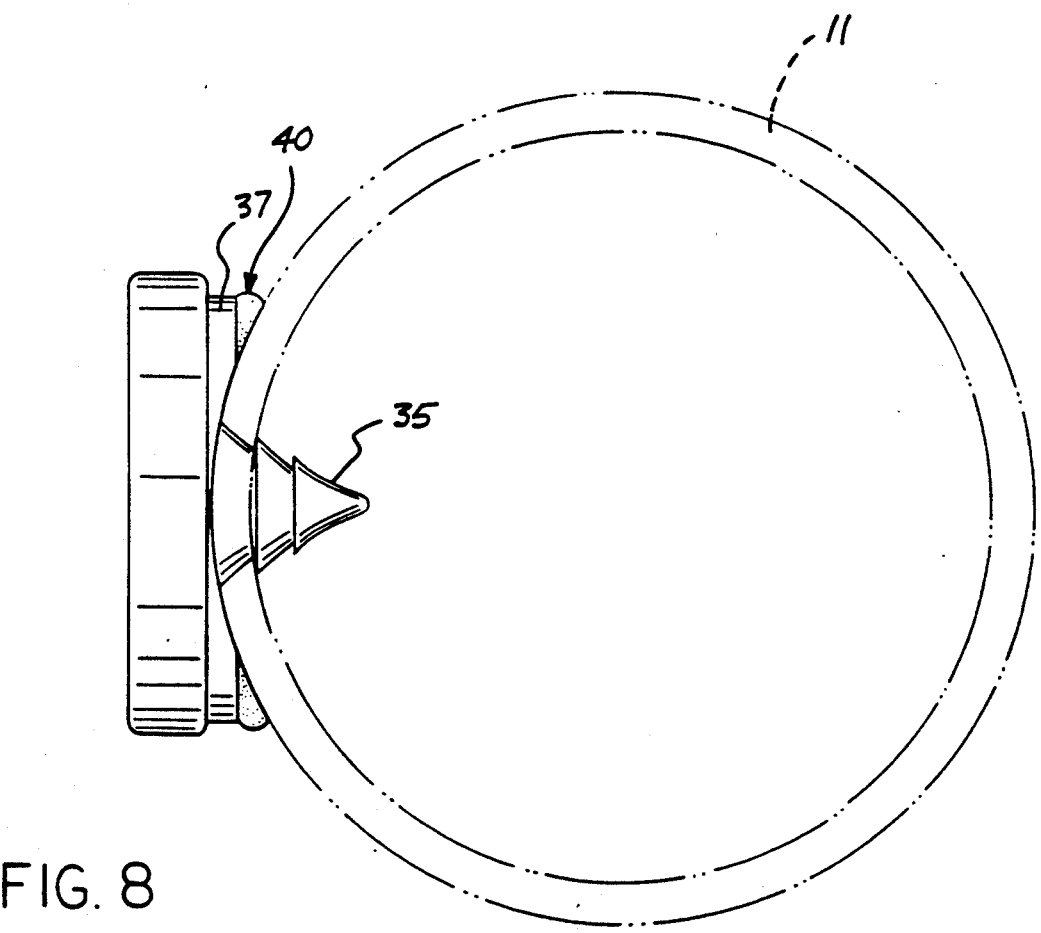
FIG. 8 is an orthographic top view of the pipe plugging structure arranged for projection within an associated pipe member.

The FIGS. 7 and 8 indicate the use of a sealing utensil in cooperation with the apparatus 10, such that a barbed conical head 35 having a barbed exterior surface, includes a cavity 36 arranged to complementarily receive the piercing head 19 therewithin, such that the barbed head 35 and the piercing head are coaxially aligned. The barbed head 35 further includes a barbed head annular flange 37 defining an annular channel 38 in surrounding relationship relative to the barbed head to receive a matrix of frangible capsules 39 onto the floor of the annular channel 38 in surrounding relationship relative to the barbed head, such that a barbed head sealing ring 40 is received upon the frangible capsules 39 within the annular channel 38. It should be noted that each of the frangible capsules 39 includes a fluid adhesive therewithin. The barbed head sealing ring 40 includes conduits 41 extending from the barbed head sealing ring rear wall 43 through the barbed head sealing ring front wall 42, with the rear wall 43 in communication with the capsules 39, such that when the capsules 39 are ruptured upon the projection of the barbed head into an opening within the pipe 11 to cause the fluid adhesive to be directed through the conduits through the front wall 42 to effect adhesive securement of the barbed head sealing ring 40 as well as the barbed head into the associated opening of the pipe 11 created by the piercing head 19.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A refrigerant pipe piercing valve apparatus, comprising, an elongate body, having a body first end and a body second end, with the body first end including a first jaw plate fixedly and orthogonally mounted to the elongate body, and, a threaded body portion mounted along the elongate body between the first jaw plate and the body second end, with an internally threaded wheel member rotatably mounted about the threaded body portion, and a second jaw plate slidable on the elongate body and is oriented between the wheel member and the first jaw plate, with the second jaw plate including a second jaw plate recess for receiving at least a portion of a refrigerant pipe, the second jaw plate recess being in facing relationship relative to the first jaw plate, with the first jaw plate having a piercing head in facing relationship relative to the recess medially of the recess, with the first jaw plate including a first conduit extending through the first jaw plate along a length thereof and a second conduit extending through the elongate body, and a third conduit directed through the piercing head and spaced from the first conduit, the third conduit being in communication with the first and second conduits, with the piercing head having a piercing head tip coaxially aligned with the piercing head, and the third conduit includes a third conduit entrance projecting through an exterior surface of the piercing head displaced from the piercing tip, wherein at least a portion of the wheel member engages the second jaw plate and slides it along the elongate body portion and moves the refrigerant pipe portion into piercing engagement with the piercing head for forming an opening therein to allow flow communication of refrigerant from the refrigerant pipe and through all the conduits.

2. An apparatus as set forth in claim 1 wherein the elongate body second end includes a tubular body sleeve engaging the second end, the sleeve having a sleeve abutment flange in facing relationship relative to the wheel member preventing removal of the wheel member relative to the elongate body, with the sleeve including a sleeve threaded projection coaxially aligned with the elongate body and the sleeve, with the sleeve having a fourth conduit coaxially aligned with the second conduit and in communication with the second conduit, with a filtration screen oriented at an interface between the second conduit and the fourth conduit.

3. An apparatus as set forth in claim 2 including an internally threaded cap arranged for securement to the threaded projection.

4. An apparatus as set forth in claim 3 wherein the first jaw plate includes a first jaw plate top wall, and a slight lens mounted within the first jaw plate in adjacency to the top wall, with the sight lens in communication with the first conduit for viewing fluid flow through the first conduit.

5. An apparatus as set forth in claim 4 including a conical barbed head, having a cavity complementarily receiving the piercing head, with the barbed head coaxially aligned with the piercing head, and the barbed head including an annular flange in surrounding relationship relative to the barbed head, with the annular flange including an annular channel, the annular channel having an annular channel floor, with a plurality of frangible capsules extending coextensively over the channel floor, with each of said capsules including a fluid adhesive, and a barbed head sealing ring mounted upon said capsules, with the barbed head sealing ring including a front wall and a rear wall, with the rear wall in contiguous communication with the capsules, and sealing ring conduits directed from the front wall through the rear wall to direct said fluid adhesive of each capsule through said sealing ring conduits upon rupturing of said frangible capsules, upon the projection of the barbed head into the opening of the refrigerant pipe created by the piercing head to cause permanent adhesive securement of the barbed head and the barbed head sealing ring around the opening to provide an effective seal thereabout, while permitting the piercing head to be removed from the barbed head cavity.

* * * * *